US012363804B2

(12) United States Patent
Kitano

(10) Patent No.: US 12,363,804 B2
(45) Date of Patent: Jul. 15, 2025

(54) INDUCTION HEATED ROLL APPARATUS

(71) Applicant: TOKUDEN CO., LTD., Kyoto (JP)

(72) Inventor: Takatsugu Kitano, Otsu (JP)

(73) Assignee: TOKUDEN CO., LTD., Kyoto (JP)

( * ) Notice: Subject to any disclaimer, the term of this patent is extended or adjusted under 35 U.S.C. 154(b) by 828 days.

(21) Appl. No.: 17/649,572

(22) Filed: Feb. 1, 2022

(65) Prior Publication Data

US 2022/0272799 A1 Aug. 25, 2022

(30) Foreign Application Priority Data

Feb. 19, 2021 (JP) ................................ 2021-025406

(51) Int. Cl.

*H05B 6/14* (2006.01)
*H05B 6/06* (2006.01)
*H05B 6/12* (2006.01)
*H05B 6/44* (2006.01)

(52) U.S. Cl.

CPC ............. *H05B 6/145* (2013.01); *H05B 6/065* (2013.01); *H05B 6/1236* (2013.01); *H05B 6/1263* (2013.01)

(58) Field of Classification Search

CPC .... H05B 6/065; H05B 6/1236; H05B 6/1263; H05B 6/145; H05B 6/42; H05B 6/44

USPC ....... 219/619, 216, 678, 696, 690, 674, 676, 219/715, 716; 399/75, 328, 320, 324, 399/330, 331, 332, 335

See application file for complete search history.

(56) References Cited

U.S. PATENT DOCUMENTS 4,775,773 A 10/1988 Verkasalo
5,752,150 A * 5/1998 Kato .................. G03G 15/2053 219/619

FOREIGN PATENT DOCUMENTS

| | | | |
|---|---|---|---|
| CN | 212463555 U | 2/2021 | |
| JP | S62178494 U | 11/1987 | |
| JP | H04306587 A | 10/1992 | |
| JP | H08069869 A | 3/1996 | |
| JP | 2004165173 A | 6/2004 | |
| JP | 2009283159 A | 12/2009 | |
| JP | 2011108399 A | 6/2011 | |
| WO | WO-2011058772 A1 * | 5/2011 | ............... H05B 6/04 |

OTHER PUBLICATIONS

Translation of WO2011058772A1, "Induction heat generation roller device", May 19, 2011, by WIPO. (Year: 2011).*
Japan Patent Office, Office action issued in Japanese Patent Application No. 2021-025406, Sep. 26, 2024, 10 pages.

* cited by examiner

*Primary Examiner* — Quang T Van
(74) *Attorney, Agent, or Firm* — Alleman Hall & Tuttle LLP

(57) ABSTRACT

The present invention is intended to adjust an amount of thermal expansion at a desired position in an axial direction of a roller body of an induction heated roll apparatus, regardless of an amount of load heat extracted from the roller body by a heating target object. The induction heated roll apparatus includes the roller body that is cylindrical and has a hollow space, a plurality of induction coils provided in an inside along the axial direction of the roller body, a power supply circuit that controls power supplied to each of the plurality of induction coils individually, and a cooling mechanism that cools the roller body by supplying a refrigerant to the roller body.

5 Claims, 5 Drawing Sheets

INDUCTION HEATED ROLL APPARATUS

BACKGROUND

Technical Field

The present invention relates to an induction heated roll apparatus.

Related Art

For example, a pair of induction heated roll apparatuses is used in a rolling process or the like for a sheet-shaped heating target object. A roller body of each of the induction heated roll apparatuses may undergo a deflection when a load is applied. This deflection on the roller body may make it difficult to uniformly roll the sheet-shaped heating target object.

To deal with this issue, an induction heated roll apparatus has been conceived as illustrated in JP S62-178494 U. This induction heated roll apparatus has a roller body provided with a plurality of induction coils in a hollow space along an axial direction thereof, and performs individual voltage control of the plurality of induction coils. That is, the induction heated roll apparatus performs the individual voltage control of the plurality of induction coils so that there is a difference in an amount of generated heat between portions of the roller body facing the respective induction coils. This allows only a predetermined portion to be locally and thermally expanded, and thus adjustment is made in a diameter profile of the roller body. As a result, the sheet-shaped heating target object can be uniform in thickness distribution.

However, the induction heated roll apparatus provides, to all of the plurality of induction coils, a total output only commensurate with an amount of load heat extracted from the roller body by the sheet-shaped heating target object. Thus, the induction heated roll apparatus may not be able to provide, to the plurality of induction coils, an output for enabling the sheet-shaped heating target object to have a uniform thickness distribution. For example, when a sheet material extracting a small amount of load heat is processed, a reduction occurs in the total output for all of the plurality of induction coils. This makes it difficult to obtain a difference in output between the induction coils for enabling the sheet material to have a uniform thickness distribution. Thus, undesirable variation in thickness distribution may not be eliminated.

PRIOR ART DOCUMENT

Patent Document

JP S62-178494 U

SUMMARY

The present invention has been made to solve the above issue, and it is therefore a main object of the present invention to adjust an amount of thermal expansion at a desired position in an axial direction of a roller body of an induction heated roll apparatus, regardless of an amount of load heat extracted from the roller body by a heating target object.

That is, an induction heated roll apparatus according to the present invention includes a roller body having a hollow cylindrical shape, a plurality of induction coils provided in a hollow space along an axial direction of the roller body, a power supply circuit that controls power supplied to each of the plurality of induction coils individually, and a cooling mechanism that cools the roller body by supplying a refrigerant to the roller body.

According to this configuration, an amount of thermal expansion can be adjusted at a desired position in the axial direction of the roller body. This adjustment can be made by controlling the power supplied to each of the plurality of induction coils individually using the power supply circuit. In the present invention, the roller body is cooled by the cooling mechanism. That is, the cooling mechanism can compensate for a required amount of load heat even when an amount of load heat extracted from the roller body by a heating target object is small. The amount of the thermal expansion can be therefore adjusted at the desired position in the axial direction of the roller body, regardless of the amount of load heat extracted from the roller body by the heating target object.

As a specific embodiment of the induction heated roll apparatus, the induction heated roll apparatus is preferably configured to heat treat a sheet-shaped heating target object. In addition, the power supply circuit is preferably configured to control the power supplied to each of the plurality of induction coils individually such that a temperature of the roller body becomes a predetermined temperature and the heating target object has a predetermined thickness distribution.

To efficiently adjust the amount of thermal expansion at the desired position in the axial direction of the roller body in accordance with the amount of load heat, the induction heated roll apparatus preferably further includes a cooling mechanism control unit that controls an amount of the refrigerant supplied by the cooling mechanism in accordance with the amount of load heat.

In the present invention, the power supplied to the plurality of induction coils is controlled individually, and thus a difference in temperature occurs on an inner surface of the roller body due to a difference in amount of generated heat. Another difference in temperature further occurs on an outer surface of the roller body due to a difference in the amount of heat extracted by the heating target object.

To eliminate these differences in temperature and make the temperature of the outer surface of the roller body uniform, the roller body preferably has a jacket chamber formed in a side circumferential wall thereof. The jacket chamber is preferably charged with a gas-liquid two-phase heating medium in a sealed manner.

As a specific embodiment of the cooling mechanism, the cooling mechanism preferably supplies the refrigerant into the hollow space of the roller body.

According to this configuration, it is only necessary to flow the refrigerant through a space between the inner surface of the roller body and the induction coils. This can simplify a configuration of the cooling mechanism.

Preferably, the cooling mechanism supplies the refrigerant to a refrigerant flow path formed radially inside with respect to the jacket chamber in the side circumferential wall of the roller body.

According to this configuration, the side circumferential wall of the roller body can be efficiently cooled.

Preferably, the cooling mechanism supplies the refrigerant individually to each portion on the inner surface of the roller body facing each of the plurality of induction coils.

According to this configuration, it is possible to locally reduce a temperature of a predetermined portion on the inner surface of the roller body. It is therefore possible to maximize a relative difference of a margin of deformation due to the thermal expansion (a difference in amount of thermal expansion) in the axial direction of the roller body.

According to the present invention configured as described above, the amount of thermal expansion can be adjusted at the desired position in the axial direction of the roller body of the induction heated roll apparatus, regardless of the amount of load heat extracted from the roller body by the heating target object.

DETAILED DESCRIPTION

One Embodiment of the Present Invention

Hereinafter, one embodiment of an induction heated roll apparatus 100 according to the present invention will be described with reference to the drawings.

The induction heated roll apparatus 100 is used, for example, in a heat treatment process or the like for a sheet-shaped heating target object, such as plastic film, paper, cloth, non-woven cloth, synthetic fiber, or metal foil. For example, a sheet-shaped heating target object W can be rolled by using two induction heated roll apparatuses 100.

Figure 1:
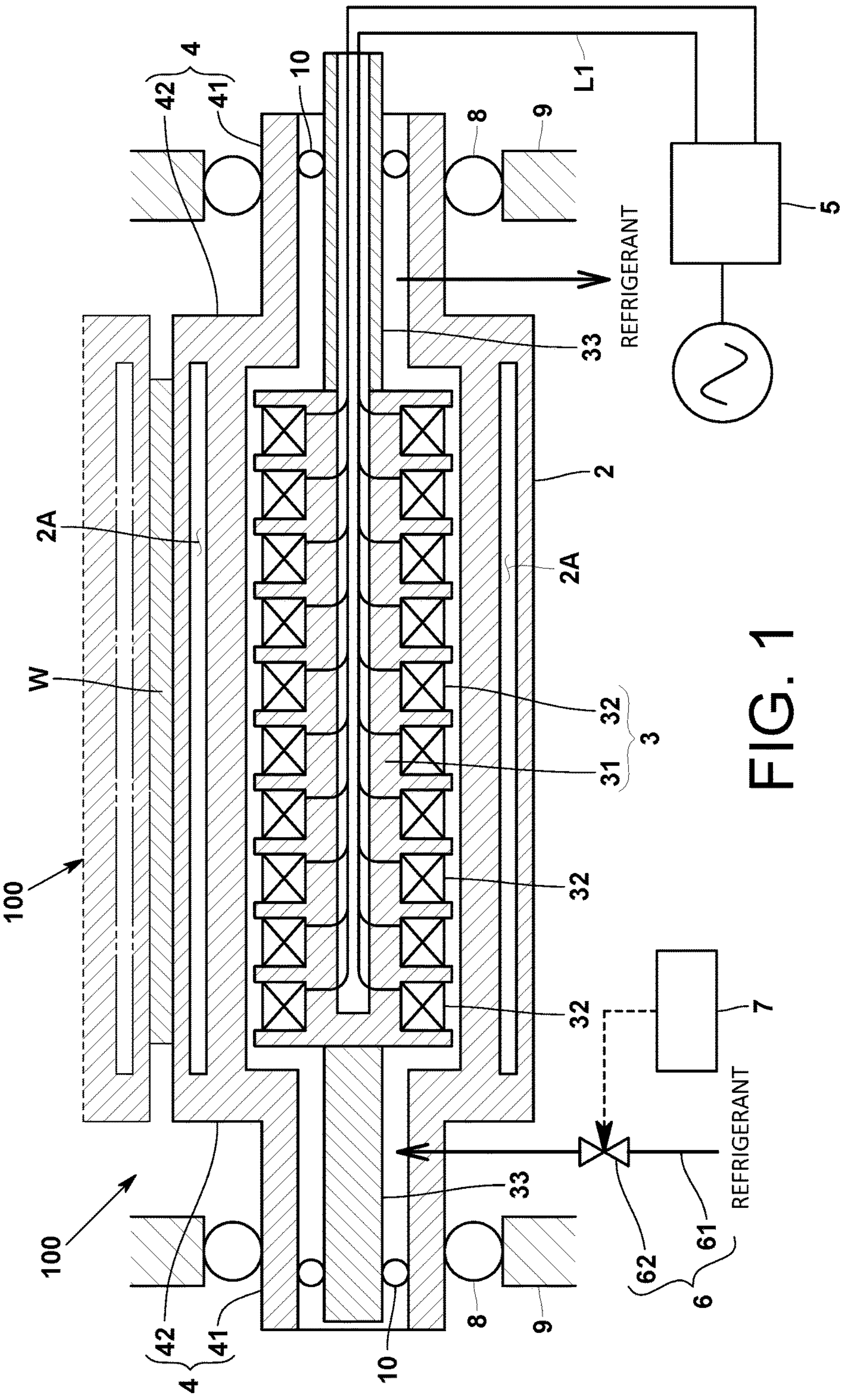
FIG. 1 is a cross-sectional view schematically illustrating a configuration of an induction heated roll apparatus according to one embodiment of the present invention.
Figure 2:
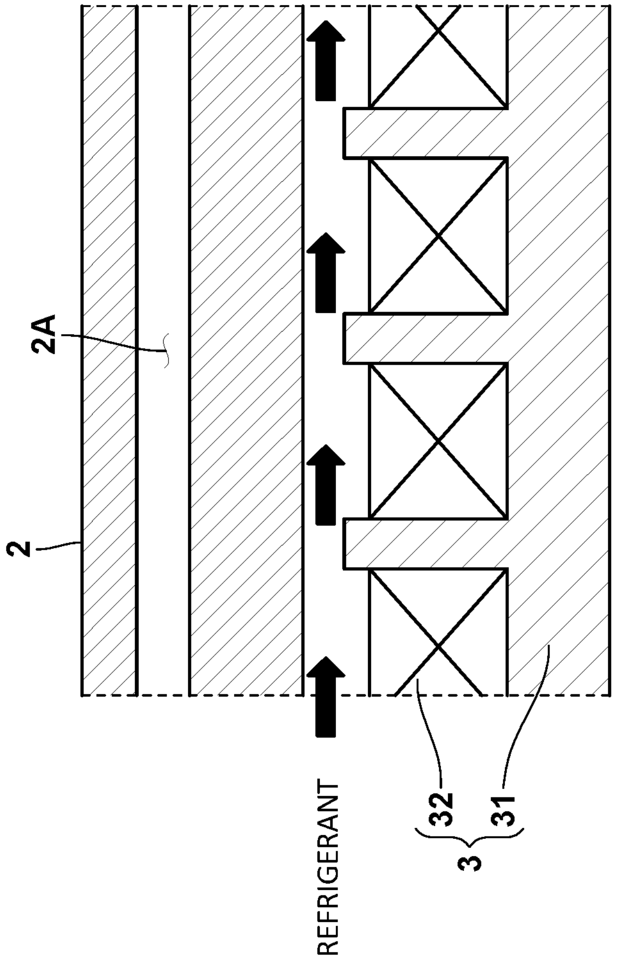
FIG. 2 is a partially enlarged cross-sectional view illustrating a flow of a refrigerant in the embodiment.

As illustrated in FIG. 1, the induction heated roll apparatus 100 according to the present embodiment includes a roller body 2 and an induction heating mechanism 3. The roller body 2 has a hollow cylindrical shape and is rotatably supported. The induction heating mechanism 3 is provided inside the roller body 2.

Both end portions of the roller body 2 are provided with respective journals 4 having respective hollow drive shafts 41, which are rotatably supported by a base 9 through respective bearings 8, such as rolling bearings. The journals 4 have the respective drive shafts 41 and respective flanges 42. Each of the flanges 42 is fixed to a corresponding axial end portion of the roller body 2. The roller body 2 is configured to be brought into rotation by an externally applied driving force from a rotation driving mechanism (not illustrated) such as a motor. In a side circumferential wall of the roller body 2 according to the present embodiment, jacket chambers 2A are formed along a longitudinal direction (a direction of a rotational axis). Each of the jacket chambers 2A is charged with a gas-liquid two-phase heating medium in a decompressed and sealed manner. These multiple jacket chambers 2A are circumferentially formed at equal intervals.

The induction heating mechanism 3 includes a cylindrical core 31 having a cylindrical shape, and a plurality of induction coils 32. The plurality of induction coils 32 is wound around an outer circumferential surface of the cylindrical core 31.

Both end portions of the cylindrical core 31 are supported by respective support shafts 33. The support shafts 33 are inserted into the respective drive shafts 41, and are rotatably supported by the respective drive shafts 41 through respective bearings 10, such as rolling bearings. The induction heating mechanism 3 is thus held in a stationary state with respect to the base 9 (fixed side) inside the roller body 2 during rotation of the roller body 2.

The plurality of induction coils 32 is provided along the axial direction of the roller body 2. To the plurality of induction coils 32, respective external lead wires L1 are connected. These external lead wires L1 are also connected to a power supply circuit 5, which is used for applying an alternating-current voltage or the like of a commercial frequency (50 Hz or 60 Hz). The power supply circuit 5 controls power supplied to each of the plurality of induction coils 32 individually.

When the alternating-current voltage is applied to the induction coils 32 through the induction heating mechanism 3 with this configuration, alternating magnetic fluxes are generated. The alternating magnetic fluxes pass through the side circumferential wall of the roller body 2. Induced currents are generated in the roller body 2 due to this passage. Due to the induced currents, the roller body 2 generates Joule heat. A temperature distribution becomes uniform in the side circumferential wall in the direction of the rotational axis of the roller body 2 due to the presence of the jacket chambers 2A.

The power supply circuit 5 then performs individual feedback control of the power supplied to each of the plurality of induction coils 32. This control is performed such that a temperature of the roller body 2 becomes a predetermined temperature and the heating target object W has a predetermined thickness distribution. Here, the temperature of the roller body 2 is detected by a temperature sensor (not illustrated), which is provided radially outside with respect to the jacket chambers 2A in the side circumferential wall of the roller body 2. The thickness distribution of the heating target object W is detected by a plurality of thickness sensors (not illustrated) including, for example, laser displacement meters.

The induction heated roll apparatus 100 according to the present embodiment further includes a cooling mechanism 6, which supplies a refrigerant to the roller body 2 and thus cools the roller body 2.

The cooling mechanism 6 extracts an amount of load heat from the roller body 2 using a refrigerant, besides an amount of load heat extracted from the roller body 2 by the heating target object W. That is, the cooling mechanism 6 according to the present embodiment extracts a required amount of load heat for obtaining a desired margin of deformation (a difference in amount of thermal expansion) in the axial direction of the roller body 2. Here, "the required amount of load heat" is obtained as follows: "the required amount of load heat"="an amount of load heat with which the desired margin of deformation (the difference in amount of thermal expansion) is obtainable"−"the amount of load heat extracted from the roller body by the heating target object."

Specifically, the cooling mechanism 6 supplies the refrigerant into a hollow space of the roller body 2, and thus cools an inner surface of the roller body 2. For example, the cooling mechanism 6 supplies the refrigerant into the hollow space of the roller body 2 from a refrigerant inlet port (not illustrated) formed on one of the journals 4 of the roller body 2. The cooling mechanism 6 also draws out the refrigerant from a refrigerant outlet port (not illustrated) formed on the other one of the journals 4. The refrigerant may be a coolant gas cooled to a predetermined temperature, or may be a coolant in a liquid or mist state.

An amount of the refrigerant supplied by the cooling mechanism 6 is controlled by a cooling mechanism control unit 7 in accordance with the amount of load heat extracted from the roller body 2 by the heating target object W. In a case where "the amount of load heat extracted from the roller body by the heating target object"≥"the amount of load heat with which the desired margin of deformation is obtainable", the cooling mechanism control unit 7 sets the amount of the refrigerant to zero. That is, the cooling mechanism control unit 7 supplies no refrigerant to the roller body 2. In a case where "the amount of load heat with which the desired margin of deformation is obtainable">"the amount of load heat extracted from the roller body by the heating target object", the cooling mechanism control unit 7 supplies a predetermined amount of the refrigerant to the roller body 2 based on "the required amount of load heat". The cooling mechanism control unit 7 controls the amount of the refrigerant by controlling a flow rate control device 62 provided in a refrigerant supply path 61 of the cooling mechanism 6. Here, the amount of load heat extracted from the roller body 2 by the heating target object W is determined from power (kW) supplied to the plurality of induction coils 32, which is required for controlling the roller body 2 to have a predetermined temperature.

Figure 3:
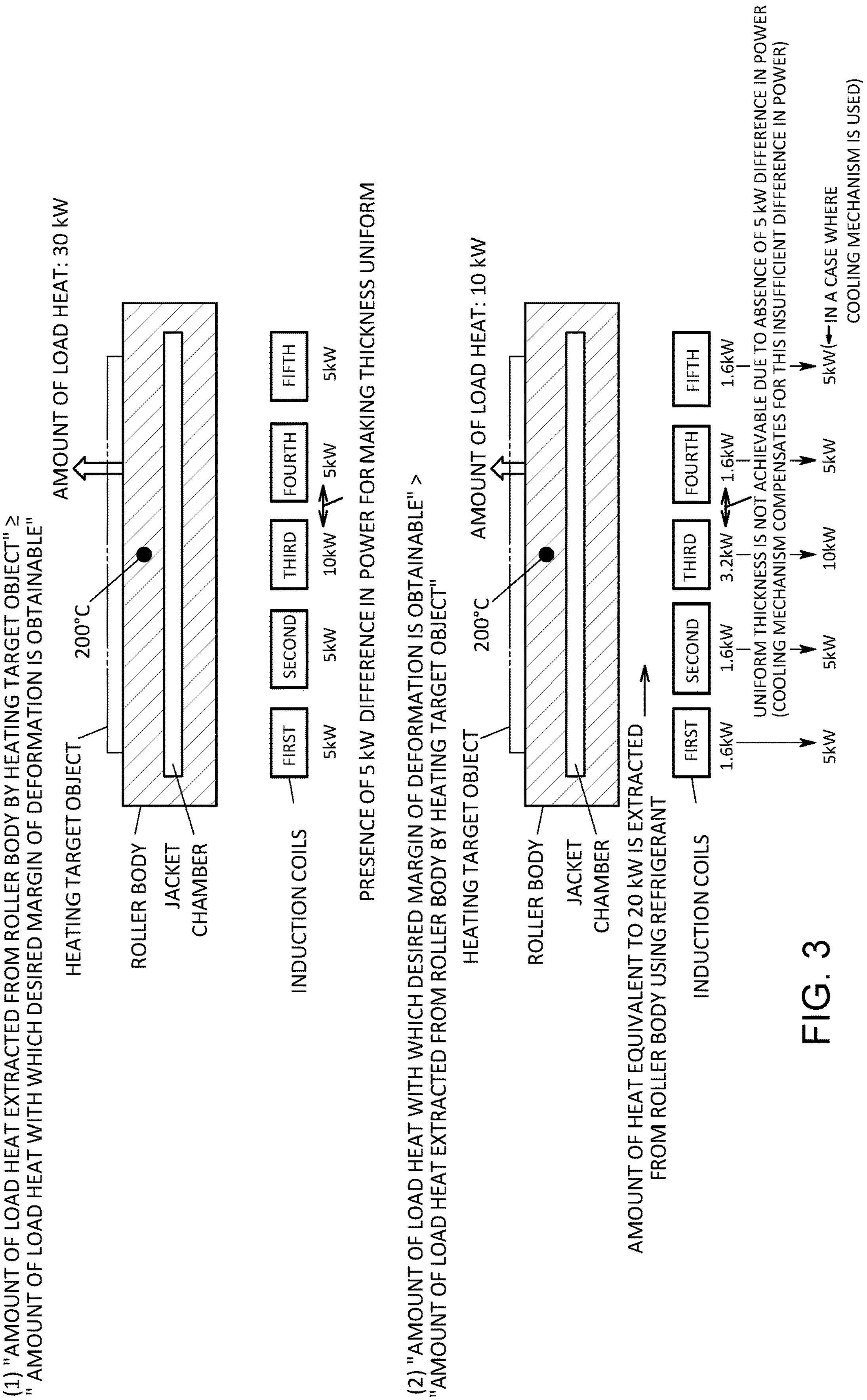
FIG. 3 is a schematic diagram illustrating operation of a cooling mechanism according to the embodiment.

Next, operation of the cooling mechanism 6 will be described with reference to FIG. 3. FIG. 3 illustrates an example in which first to fifth induction coils 32 are used, for illustrative purposes.

(1) A case where "the amount of load heat extracted from the roller body by the heating target object"≥"the amount of load heat with which the desired margin of deformation is obtainable"

For example, an assumption is made that the power supply circuit 5 controls the power supplied to the plurality of induction coils 32 such that the temperature of the roller body 2 becomes 200° C., and, at this time, the amount of load heat extracted from the roller body 2 by the heating target object W is 30 kW.

Here, the power supply circuit 5 controls the power supplied to each of the plurality of induction coils 32 individually such that the heating target object W after heat treatment has a uniform thickness distribution. A further assumption is made that 5 kW of power is supplied to each of the first, second, fourth, and fifth induction coils 32, and 10 kW of power is supplied to the third induction coil 32, in order to make the thickness distribution of the heating target object W after the heat treatment uniform. To make the thickness uniform, for example, it is necessary to have a difference in power between the third induction coil 32 and the second induction coil 32 by 5 kW. The amount of load heat with which the desired margin of deformation is obtainable is 30 kW in this case.

(2) A case where "the amount of load heat with which the desired margin of deformation is obtainable">"the amount of load heat extracted from the roller body by the heating target object"

Even when the amount of load heat extracted from the roller body 2 by the heating target object W becomes 10 kW, the power supply circuit 5 controls the power supplied to the plurality of induction coils 32 such that the temperature of the roller body 2 becomes 200° C.

Even in this case, the power supply circuit 5 controls the power supplied to each of the plurality of induction coils 32 individually such that the heating target object W after the heat treatment has a uniform thickness distribution. However, only 10 kW of power in total is supplied to the plurality of induction coils 32. That is, about 1.6 kW of power is supplied to each of the first, second, fourth, and fifth induction coils 32, and about 3.2 kW of power is supplied to the third induction coil 32. In this case, for example, the difference in power between the third induction coil 32 and the second induction coil 32 becomes about 1.6 kW. This falls below 5 kW, which is a value required for making the thickness uniform.

In this case, the cooling mechanism 6 is used for cooling the roller body 2 and thus compensating for 20 kW of power, which is the required amount of load heat. Therefore, 30 kW of power in total is supplied from the power supply circuit 5 to the plurality of induction coils 32. That is, 5 kW of power is supplied to each of the first, second, fourth, and fifth induction coils 32, and 10 kW of power is supplied to the third induction coil 32. The amount of load heat with which the desired margin of deformation is obtainable is therefore totally achieved. As a result, the heating target object W after the heat treatment can have a uniform thickness distribution.

Effects of the Embodiment

According to the induction heated roll apparatus 100 configured as described above, an amount of thermal expansion can be adjusted at a desired position in the axial direction of the roller body 2. This adjustment can be made by controlling the power supplied to each of the plurality of induction coils 32 individually using the power supply circuit 5. In the present embodiment, the roller body 2 is cooled by the cooling mechanism 6. That is, compensation can be made, by the cooling mechanism 6, for the required amount of load heat for making the thickness distribution of the heating target object W uniform, even when the amount of load heat extracted from the roller body 2 by the heating target object W is small. The amount of thermal expansion can be therefore adjusted at the desired position in the axial direction of the roller body 2, regardless of the amount of load heat extracted from the roller body 2 by the heating target object W. This enables nip pressure to be equalized, when the sheet-shaped heating target object W is rolled using the induction heated roll apparatus 100 according to the present embodiment. A high-quality sheet-shaped product can be therefore manufactured.

Other Modified Embodiments

Figure 4:
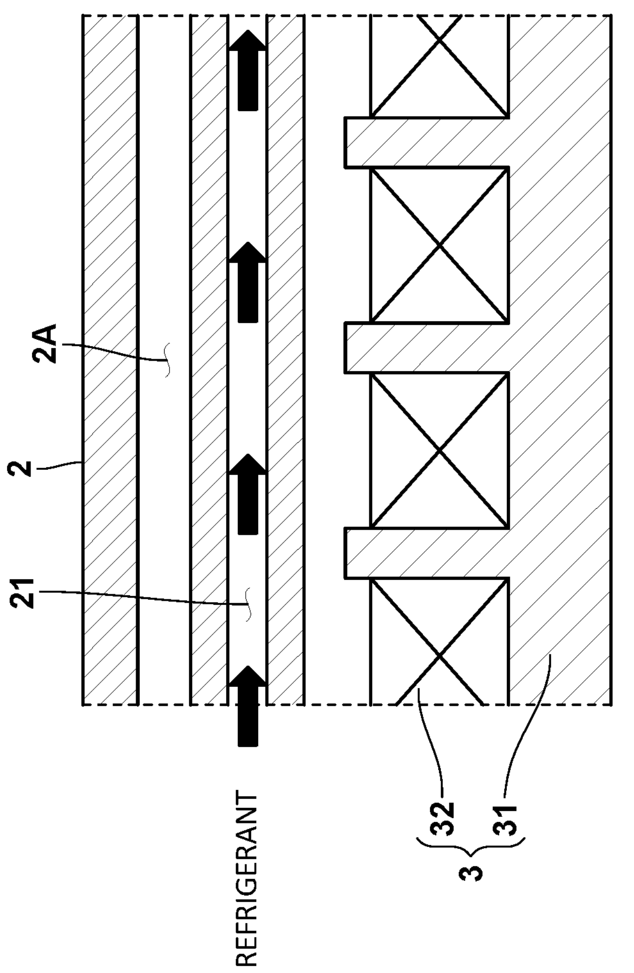
FIG. 4 is a partially enlarged cross-sectional view illustrating a flow of a refrigerant in a modified embodiment.

For example, as illustrated in FIG. 4, the cooling mechanism 6 may supply the refrigerant to refrigerant flow paths 21, which are formed radially inside with respect to the jacket chambers 2A in the side circumferential wall of the roller body 2. These multiple refrigerant flow paths 21 are circumferentially formed at equal intervals. For example, the cooling mechanism 6 supplies the refrigerant to the refrigerant flow paths 21 from a refrigerant inlet port formed on one of the journals 4 of the roller body. The cooling mechanism 6 also draws out the refrigerant from a refrigerant outlet port formed on the other one of the journals 4.

Figure 5:
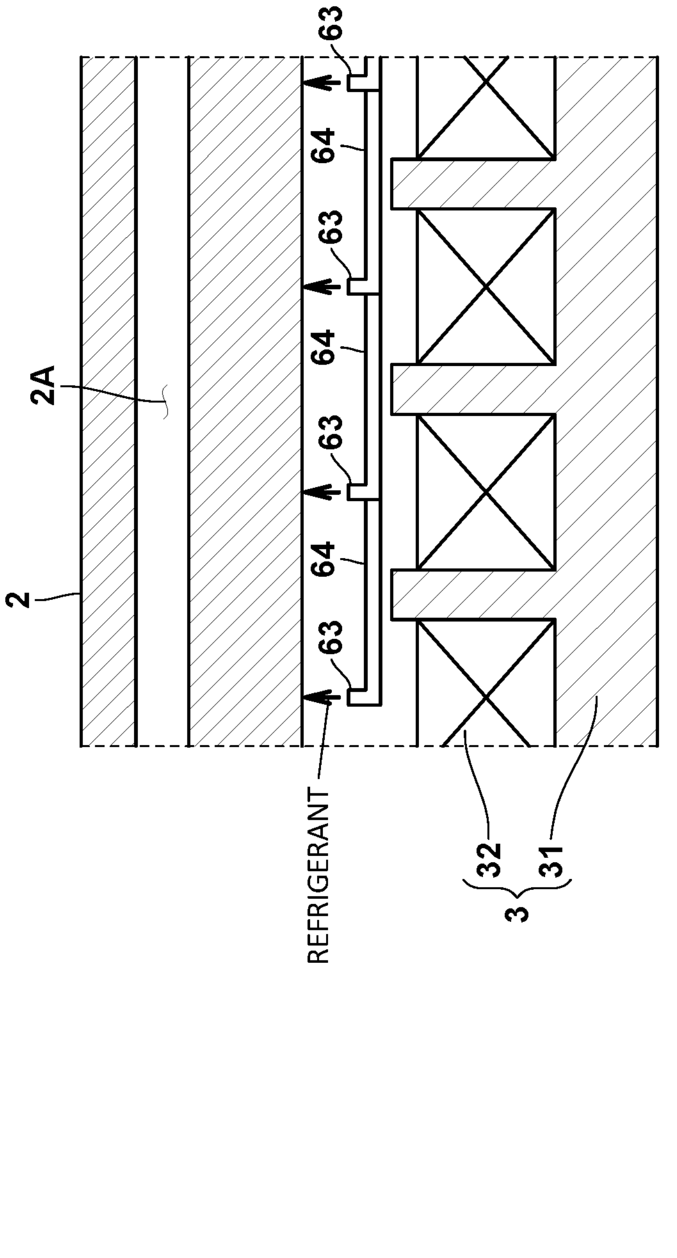
FIG. 5 is a partially enlarged cross-sectional view illustrating a flow of a refrigerant in another modified embodiment.

Further, as illustrated in FIG. 5, the cooling mechanism 6 preferably supplies the refrigerant individually to each portion on the inner surface of the roller body 2 facing each of the plurality of induction coils 32. Specifically, the cooling mechanism 6 has a plurality of refrigerant supply ports 63. The cooling mechanism 6 can switch between supply and not-supply of the refrigerant from each of the plurality of refrigerant supply ports 63. For example, it is conceivable that the cooling mechanism 6 has a plurality of supply pipes 64, each of which has each of the plurality of refrigerant supply ports 63 formed therein. In this case, each of the plurality of supply pipes 64 is also conceived to have an on-off valve (not illustrated) provided therein. The number of refrigerant supply ports 63 may be the same as or different from the number of induction coils 32. According to this configuration, it is possible to locally reduce a temperature of a predetermined portion on the inner surface of the roller body 2. It is therefore possible to maximize a relative difference of a margin of deformation due to the thermal expansion (a difference in amount of thermal expansion) in the axial direction of the roller body 2.

Further, the present invention is not limited to the above embodiments, and it goes without saying that various modifications can be made without departing from the spirit of the present invention.

DESCRIPTION OF REFERENCE CHARACTERS

100: induction heated roll apparatus
2: roller body
2A: jacket chamber
32: plurality of induction coils
5: power supply circuit
6: cooling mechanism
7: cooling mechanism control unit
21: refrigerant flow path

What is claimed is:

1. An induction heated roll apparatus that is an apparatus for heat treating a heating target object having a sheet shape, the induction heated roll apparatus comprising:
- a roller body that is cylindrical and has a hollow space;
- a plurality of induction coils provided in the hollow space along an axial direction of the roller body;
- a power supply circuit configured to control power supplied to each of the plurality of induction coils individually;
- a cooling mechanism configured to cool the roller body by supplying a refrigerant to the roller body; and
- a cooling mechanism control unit configured to control an amount of the refrigerant supplied by the cooling mechanism in accordance with an amount of load heat, wherein
- the power supply circuit controls the power supplied to each of the plurality of induction coils individually for causing a temperature of the roller body to become a predetermined temperature and causing the heating target object to have a predetermined thickness distribution, and
- when an amount of load heat with which a desired margin of deformation is obtainable in the axial direction of the roller body is greater than an amount of load heat extracted from the roller body by the heating target object, the cooling mechanism control unit controls the amount of the refrigerant to the roller body based on a difference between the amounts of load heat.

2. The induction heated roll apparatus according to claim 1, wherein the roller body has a jacket chamber formed in a side circumferential wall of the roller body, the jacket chamber being charged with a gas-liquid two-phase heating medium in a sealed manner.

3. The induction heated roll apparatus according to claim 2, wherein the cooling mechanism supplies the refrigerant to a refrigerant flow path formed radially inside with respect to the jacket chamber in the side circumferential wall of the roller body.

4. The induction heated roll apparatus according to claim 1, wherein the cooling mechanism supplies the refrigerant into the hollow space of the roller body.

5. An induction heated roll apparatus, comprising:
- a roller body that is cylindrical and has a hollow space;
- a plurality of induction coils provided in the hollow space along an axial direction of the roller body;
- a power supply circuit configured to control power supplied to each of the plurality of induction coils individually; and
- a cooling mechanism configured to cool the roller body by supplying a refrigerant to the roller body, wherein
- the cooling mechanism supplies the refrigerant individually to each portion on an inner surface of the roller body facing each of the plurality of induction coils.

* * * * *